July 29, 1969 T. J. RYAN 3,458,814
TESTER FOR DETERMINING THE SEMICONDUCTOR MATERIAL
TYPE OF TRANSISTORS
Filed Nov. 5, 1964
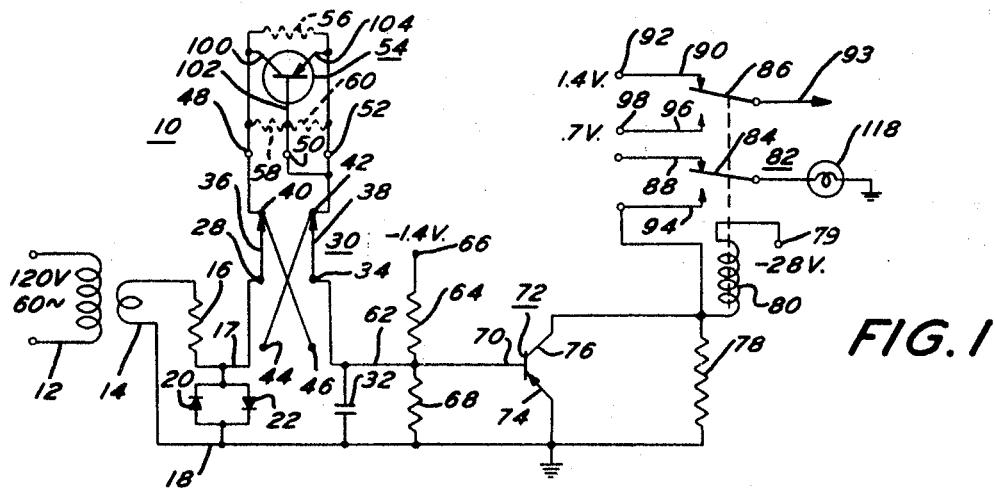
FIG. 1
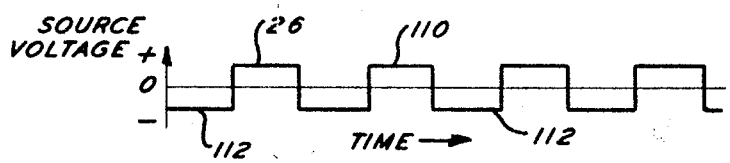
FIG. 2
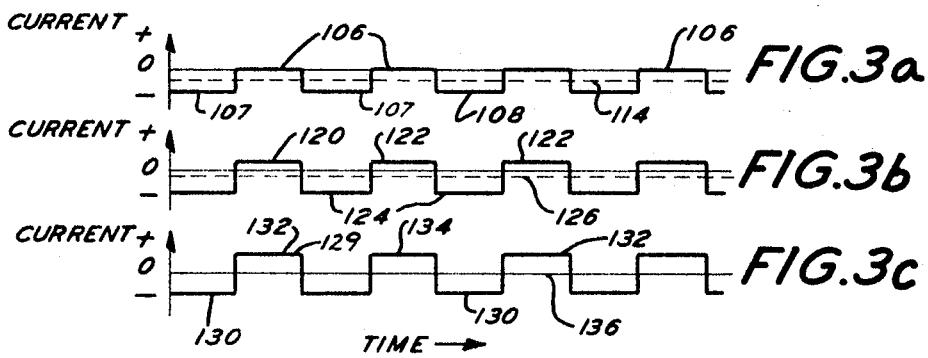
FIG. 3a
FIG. 3b
FIG. 3c
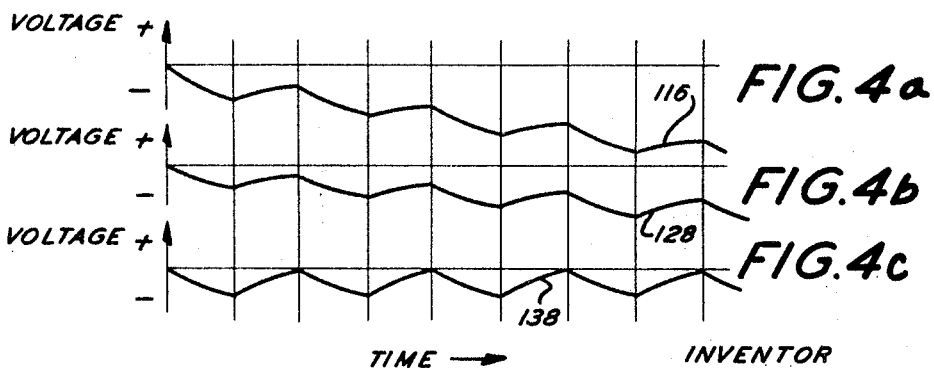
FIG. 4a
FIG. 4b
FIG. 4c
INVENTOR
THOMAS J. RYAN
BY Jacob Trachtman
ATTORNEY Patented July 29, 1969

3,458,814
TESTER FOR DETERMINING THE SEMICONDUCTOR MATERIAL TYPE OF TRANSISTORS
Thomas J. Ryan, Buckingham, Pa., assignor to American Electronic Laboratories, Inc., Colmar, Pa., a corporation of Pennsylvania
Filed Nov. 5, 1964, Ser. No. 409,144
Int. Cl. G01r 31/26
U.S. Cl. 324—158          13 Claims

ABSTRACT OF THE DISCLOSURE

A semiconductor material detecting means comprising means for electrically engaging an in-circuit transistor unit having base, collector and emitter leads and connecting together two of said leads for testing said unit, means for impressing an alternating signal of predetermined amplitude across said in-circuit unit between its connected and unconnected leads, the voltage of said signal having a predetermined peak amplitude sufficient to cause forward current conduction of transistor units composed of a first particular material and an amplitude in sufficient to cause forward current conduction of transistor units made of a second particular material, and means for detecting rectification of said signal by said in-circuit unit for determining by the presence or absence of said rectified signal whether said unit is composed respectively of said first or second materials.

---

The invention relates to semiconductor material detecting means, and more particularly to a semiconductor or transistor testing device for determining the material of which the semiconductor or transistor is composed.

In order to prevent damage to semiconductor devices such as transistors it is important to know the material, such as silicon or germanium, of which the transistor is made so that proper test voltages can be applied. Similarly, in order to obtain optimum results, when subjecting an unknown semiconductor device to tests to determine its condition or whether the device is operative, or in tests where the unkown leads of the transistor are to be determined, best results are achieved by providing optimum test voltages depending upon the material of which the device is composed. In making preliminary tests to determine the material of which the semiconductor device is composed, in many cases the leads of the device are an additional unknown factor.

Therefore, it is a principal object of the invention to provide a new and improved means for determining the material of which a semiconductor device is composed.

Another object of the invention is to provide a new and improved means which can determine the material of which a semiconductor or transistor device is composed with the particular leads of the device being unkown.

Another object of the invention is to provide a new and improved means for determining the material of which a semiconductor or transistor device is composed while the device is connected in a circuit, and without removing such device from the circuit.

Another object of the invention is to provide a means for determining the material of which a semiconductor or transistor device is composed and automatically delivering an output signal appropriate for the continued testing of the particular device after determining the material of which it is composed.

Another object of the invention is to provide a means for determining the composition of a semiconductor or transistor device and delivering output test signals which are optimum for proceeding with tests to which the device is to be subjected.

Another object of the invention is to provide a semiconductor detecting means which is highly simple in form, accurate in operation and inexpensively produced.

The above, as well as many other objects of the invention, are achieved by providing a semiconductor material detecting means comprising means for electrically engaging an in-circuit semiconductor or transistor unit having base, collector and emitter leads, which means connects together two of said leads for testing the unit. A source provides alternating signals of predetermined amplitude and a switch means is included having first and second positions for connecting and reversing the connection of said source of signals across said in-curcuit unit between its connected and unconnected leads to determine whether said unit is made of germanium or silicon material. The voltage of said signal from said source has a predetermined peak amplitude sufficient to cause forward current conduction of transistor units composed of germanium material and an amplitude insufficient to cause forward current conduction of transistor units composed of silicon material. Means are provided for detecting the rectification by said unit of said signal for determining by the presence or absence of the rectified signal whether the unit is composed respectively of germanium or silicon material. Said detecting means includes a capacitor element charged by the rectified current and a device detecting the voltage amplitude of the charged capacitor with said switch means in its first and second positions for determining the material of said unit under test.

The source of alternating signals may provide a square wave signal with a zero direct current component and provide means for delivering respectively first and second signals for continued testing of the unit responsive to the material of the unit determined by the detecting means. The output means may comprise a relay delivering a direct current signal of 1.4 volts when deenergized and a direct current signal of .7 volt when energized by said detecting means upon determining that the transistor unit under test is composed of germanium material.

The foregoing and other objects of the invention will become more apparent as the following detailed description of the invention is read in conjunction with the drawings, in which:

FIGURE 1 is a schematic representation of a semiconductor material detecting means embodying the invention, FIGURE 2 is a graphic representation of a square wave signal generated by the semiconductor material detecting means of FIGURE 1, FIGURES 3a, 3b, and 3c are respective graphic representations of current waveforms produced by transistor devices being tested under various conditions, and FIGURES 4a, 4b and 4c are graphic representations of the voltage waveforms produced across the charging capacitor of the detecting means of FIGURE 1 by the respective current waveforms shown in FIGURES 3a, 3b and 3c.

Like reference numerals designate like parts throughout the several views.

FIGURE 1 is a schematic diagram of a semiconductor material testing means 10 embodying the invention and particularly adapted for testing transistor devices.

In input winding 12 of the step down voltage transformer of means 10 receives an alternating signal which has its voltage reduced at its secondary winding 14 and is delivered through a resistor 16 to a lead 17 and by a lead 18 for application across a pair of oppositely poled crystal diodes 20, 22. The diode 22 is poled to conduct current in a forward direction when a positive polarity signal is delivered to the line 17 through the resistor 16 and the negative polarity signal is delivered to the line 18, while the diode 20 conducts in a forward direction when a positive polarity signal is delivered to the line 18 and the negative polarity signal is received by the line 17. Since the voltage drop across the diodes 20, 22 in a forward direction is .55 volt, this results in the production of a substantially square wave signal voltage 26 between the line 17 and 18 having a peak to peak voltage of 1.1 volts as shown in FIGURE 2.

The line 17 connects to the terminal 28 of a reversing switch 30 while the line 18 connects through a signal storing capacitor 32 to the terminal 34 of the switch 30. The terminals 28, 34 are connected respectively by armatures 36, 38 with terminals 40, 42 of the switch 30 when in its first position, while contacting terminals 44, 46 when in its second position. The terminal 42 is connected with terminal 44, while terminal 40 is connected with terminal 46 to provide reversing action by the switch 30.

Transistor engaging terminals 48, 50 and 52 are provided for respectively engaging the three leads corresponding to the base, collector and emitter leads of a transistor 54 which may be connected in-circuit, as indicated by the dashed shunt resistors 56, 58 and 60. The leads of the transistor 54 may be connected individually in any order to the three contacting terminals 48, 50 and 52, thereby making it unnecessary to know the particular leads of the device 54 to be tested.

The terminal 48 is connected directly to the terminal 40, while the terminals 50, 52 are connected together and joined to the terminal 42 of the switch device 30.

The terminal 34 of the switch 30 is connected to a line 62 which is returned through a resistor 64 to a terminal 66 which is maintained at a negative potential of 1.4 volts and line 18 is connected to line 18 by a resistor 68. The line 62 also connects to the base electrode 70 of a PNP type transistor 72 which has its emitter 74 connected to line 18 which is connected to ground potential, and its collector 76 returned to ground potential through a resistor 78.

The transistor 72, which is normally nonconducting, has its collector 76 also returned to a terminal 79 maintained at a negative potential of 28 volts through the activating coil 80 of a relay 82 having armatures 84 and 86. When the relay 82 is deenergized, its armature 84 engages an open contact 88, while its armature 86 engages a contact 90 joined with a terminal 92 receiving a positive potential of 1.4 volts. The armature 86 is connected to an output line 93, while the armature 84 is connected to ground potential through an indicating bulb 118.

Upon energization of the relay 82, its armature 84 engages the contact 94 which results in returning the collector 76 of the transistor 72 to ground potential through bulb 118, illuminating the bulb and providing a holding circuit for the relay 82. Upon energization of the relay 82, the armature 86 also engages the contact 96 which is joined to a terminal 98 receiving a positive potential of .7 volt, resulting in the delivery of this potential to the output line 93 for use in further testing of the transistor device 54.

In operation, in order to determine the material from which the semiconductor device, such as a transistor 54, is composed, the contacts 48, 50 and 52 may be connected to the in-circuit transistor device 54. Of course, the terminals may also be connected to an out-of-circuit transistor device for making the tests described. However, the means 10 is particularly useful when in-circuit transistors are tested, since determinations under such conditions are generally more difficult and such in-circuit testing is much more desirable since the tested transistor need not be removed or disturbed from its connections within a circuit.

Although the example illustrated shows the use of the device of the means 10 for testing a transistor, same can be applied to the testing of the semiconductor devices including crystal diodes for determining material of which it is composed.

The particular means 10 described is adapted for distinguishing between germanium and silicon material of a semiconductor or transistor device. The materials of which such devices are composed and the difference in characteristics of such devices made of different materials makes it advantageous to determine the material of a transistor to prevent its burn out during further testing and to obtain optimum results in any testing which may be made upon such devices.

With the transistor device 54 connected as shown in FIGURE 1, a square wave signal 26 generated by the means 10 is applied through the switching unit 30 and capacitor 32 across the unconnected lead 100 and the connected together lead 102 and 104 of the in-circuit transistor 54.

In the example shown, the unconnected lead 100 of the transistor 54 is the collector, while the connected leads are the base lead 102 and emitter leads 104. Of course, if any other combination of unconnected and connected leads may be provided by the manner in which the leads are connected to the terminals 48, 50 and 52 of the device 10. However, for the purpose of the test to be conducted by the device 10, the particular arrangement of the connected and unconnected leads of the device is not material. This is evident from the fact that with any two of the leads connected together, a signal voltage which passes between the connected and unconnected leads will result in a current conduction by the transistor when the voltage is impressed in the forward direction. In other words, if the voltage is applied in the forward and reverse directions, current will flow in one or the other directions in which the voltage is impressed across the unconnected and connected leads of the transistor 54, no matter which two of the transistor leads are connected together. With this in mind and the further condition that the voltage is sufficiently high to result in forward conduction, passing of the square wave signal across the transistor 54 under test will now result in the flow of current during the half cycle of the square wave 26 when the current is impressed in the proper polarity to result in conduction.

FIGURE 3a shows the waveform curve 108 of current passing through the transistor 54 made of germanium and the capacitor 32 when the transistor 54 is connected as shown in FIGURE 1 and with the absence of shunt resistors 56, 58 and 60. This is similar to the situation where the transistor is tested out of circuit.

When a positive voltage appears on line 17 and is supplied to the collector lead 100, a negative voltage is supplied to the base and emitter leads 102, 104, no current conduction takes place, as indicated at the regions 106 of the current curve 108 and corresponds to the positive portions 110 of the curve of the voltage 26 shown in FIGURE 2. When a negative signal appears on the line 17, and a positive signal appears on the line 18, corresponding to the portions 112 of the curve of voltage 26, a positive signal is applied to the base lead 102 and emitter lead 104, while a negative signal is applied to the collector lead 100 of the transistor 54. This results in forward current conduction, as indicated by portions 107 of curve 108 in FIGURE 3a, provided that the transistor 54 is composed of germanium material since forward conduction takes place with voltages exceeding .3 volt. If the transistor 56 is made of silicon, forward conduction will not result. This is because the voltage of .55 volt is insufficient to result in forward conduction of a silicon transistor, a minimum voltage of .6 volt being required for forward conduction.

Assuming that the transistor 54 is composed of germanium material, current will flow through the capacitor 32, having a waveform 108 shown in FIGURE 3a with an average current component shown by the dashed line 114. The average current component results in a negative charge build up upon the capacitor 32 and provides a negative signal to the base lead 70 of the normally nonconducting transistor 72.

The curve 116 of FIGURE 4a indicates the charging voltage across the capacitor 32 for condition when the current having waveform 108 shown in FIGURE 3a passes therethrough. Because of the average negative D.C.

component, the capacitor progressively increases its negative charge, as shown in FIGURE 4a. When the negative signal is of sufficient amplitude, the transistor 72 becomes conductive producing an increased flow of current through the energizing coil 80 of the relay 82. Since current had been flowing through the relay coil 80 by means of the path provided through the resistor 78, the relay 82 is maintained close to its condition of energization, the increased current due to the conduction of the transistor 72 resulting in the energization of the armatures 84, 86 of the relay 82. The energization of the armature 84 provides a holding circuit for the relay 82, while the energization of the armature 86 delivers an output potential of .7 volt to the output line 93 which may be the appropriate voltage for continued testing of the transistor 54 composed of germanium material.

In the event that the transistor 54 is made of silicon material, then conduction of current does not occur on either half cycle of the square wave signal 26 and the capacitor 32 does not acquire a negative charge, thereby resulting in the relay 82 remaining inactive. Under such conditions, the armature 86 of the relay 82 maintains its engagement with the contact 92, providing a potential of 1.4 volts to the output lead 93 which may be a voltage appropriate for continued testing of the transistor 54 which is composed of silicon material.

The energization of the relay 82, by providing the holding circuit and having its armature returned to ground potential through an indicating bulb 118 which is illuminated when the relay 82 is energized, indicates that a transistor 54 under test is made of germanium material, while the non-illumination of the bulb serves to indicate that the transistor under test is composed of silicon material.

FIGURE 3b shows the current waveform 120 when the transistor device 54 is connected in circuit with shunt impedance elements. Instead of not having current conduction in the reverse direction as in the case previously considered in FIGURE 3a, current now also flows during the reverse current half cycles of the square wave voltage 26, as illustrated at 122 of FIGURE 3b. However, under these conditions, the negative flowing current during the remaining half cycles as illustrated at 124, has a greater amplitude and still results in an average negative current, illustrated by the dashed lines 126. Under the above conditions, with the presence of a transistor 54 composed of germanium, negative charge is acquired by the capacitor 32, resulting in the energization of the relay 82 and illumination of the bulb 118 for the delivery of an appropriate output signal on the output line 93. The voltage generated by the capacitor 32 is illustrated by the waveform 128 in FIGURE 4b which progressively becomes more negative, but at a slower rate than that illustrated by the curve 116 of FIGURE 4a where no shunt impedances are present.

In the case where transistor 54 is made of silicon, the transistor will not conduct in either the forward or backward directions and equal conduction of current will occur in both directions during positive and negative voltage half cycles through the shunt resistors which are nondirectional. Such current flow provides a zero D.C. current component and does not result in the build up of a charge upon capacitor 32. Thus, transistor 72 does not conduct, to indicate that transistor 54 is made of silicon material.

FIGURE 3c illustrates a condition where the transistor 54, which may be made of any material, is defective by having internal shunts or is shunted by very low or shorted impedances in the in-circuit arrangement. This results in equal flow of current during the positive and negative half cycles of the square wave 26. Thus, the negative portions 130 and positive portions 132 of the current waveform 134 of FIGURE 3c are equal and the average direct current is zero and represented by the line 136. The voltage produced across the capacitor 32 fluctuates between two fixed values and does not progressively become more negative as illustrated by the voltage waveform 138 of FIGURE 4c. The voltage across the capacitor 32 thus, does not become sufficiently negative to indicate that the transistor 54 of germanium material is present. Therefore, in determining whether the transistor 54 is made of silicon or germanium material, this determination is only made under the conditions that an operative transistor 54, which is not internally shorted or shorted in its circuit arrangement, is under test.

Although the semiconductor material detecting means 10 has been described in connection with a transistor device 54, the apparatus may be readily adapted by those skilled in the art for determining the material of diodes and other semiconductor devices. It is also noted that the illustrations in connection with determining composition of a semiconductor as either being made of silicon or germanium, utilization is made of their different forward conducting minimum voltage thresholds. Of course, the invention may be used to determine differences in materials other than germanium or silicon when similar appropriate differences between forward conduction thresholds exist and the invention is, therefore, not limited to materials used in the illustration provided herein.

The transistor semiconductor material detecting means may be used as a preliminary step in a series of testing steps for providing the proper conditions and voltages to be applied in testing the transistor after determining the material of which it is composed or the device may be used for independently making a determination of the material of the transistor or semiconductor device. Similarly, the detecting means may also be provided with other automatic means for connecting the transistor 54 under test into other circuits or doing other such things which may be required after determining the material of which the transistor 54 is composed rather than only supplying the signal voltages and providing the indication of the material found, as illustrated in the embodiment of the device shown herein, as will be obvious to those skilled in the art.

I claim:
1. A semiconductor material detecting means comprising means for electrically engaging a transistor unit having base, collector and emitter leads and connecting together two of said leads for testing said unit, means for impressing an alternating signal of predetermined amplitude across said unit between its connected and unconnected leads, said predetermined amplitude being sufficient to cause forward current conduction of units made of one material and insufficient to cause conduction of units made of another material, and means for detecting rectification of said signal by said unit for determining the material of said unit.

2. The means of claim 1 in which the means for electrically engaging said transistor unit includes first, second and third leads for engaging the base, collector and emitter leads respectively of said transistor unit while said transistor unit is connected in circuit with other electrical components.

3. The means of claim 1 in which said detecting means includes means for reversing the polarity of rectification of said transistor unit.

4. A semiconductor material detecting means comprising means for electrically engaging an in-circuit transistor unit having base, collector and emitter leads and connecting together two of said leads for testing said unit, means for impressing an alternating signal of predetermined amplitude across said in-circuit unit between its connected and unconnected leads, the voltage of said signal having a predetermined peak amplitude sufficient to cause forward current conduction of transistor units composed of a first particular material and an amplitude insufficient to cause forward current conduction of transistor units made of a second particular material, and means for detecting rectification of said signal by said in-circuit unit for determining by the presence or absence of said rectified signal whether said unit is composed respectively of said first or second materials.

5. A semiconductor material detecting means comprising means for electrically engaging an in-circuit transistor unit having base, collector and emitter leads and connecting together two of said leads for testing said unit, means for impressing an alternating signal of predetermined amplitude across said in-circuit unit between its connected and unconnected leads to determine whether said unit is made of germanium or silicon material, the voltage of said signal having a predetermined peak amplitude sufficient to cause forward current conduction of transistor units composed of germanium material and an amplitude insufficient to cause forward current conduction of transistor units composed of silicon material, and means for detecting the rectification of said signal by said unit for determining by the presence or absence of said rectified signal whether said unit is composed respectively of germanium or silicon material.

6. The means of claim 5 including output means for delivering respectively first or second signals for continued testing of said unit responsive to said detecting means determining the material of said unit.

7. A semiconductor material detecting means comprising means for electrically engaging an in-circuit transistor unit having base, collector and emitter leads and connecting together two of said leads for testing said unit, means for impressing an alternating signal of predetermined amplitude across said in-circuit unit between its connected and unconnected leads, said predetermined amplitude being sufficient to cause forward current conduction of units made of one material and insufficient to cause conduction of units made of another material, and detecting means for detecting rectification of said signal for determining the material of said unit including a capacitor element.

8. The means of claim 7 in which said detecting means includes means for reversing the polarity of rectification of said in-circuit transistor unit.

9. A semiconductor material detecting means comprising means for electrically engaging an in-circuit transistor unit having base, collector and emitter leads and connecting together two of said leads for testing said unit, means for impressing an alternating signal of predetermined amplitude across said in-circuit unit between its connected and unconnected leads, the voltage of said signal having a predetermined peak amplitude sufficient to cause forward current conduction of transistor units composed of a first particular material and an amplitude insufficient to cause forward current conduction of transistor units made of a second particular material, and means for detecting rectification of said signal by said in-circuit unit for determinating by the presence or absence of said rectified signal whether said unit is composed respectively of said first or second materials including a capacitor element charged by said rectified current and a device detecting a predetermined minimum D.C. charge amplitude of said capacitor for determining the material of said unit under test.

10. A semiconductor material detecting means comprising means for electrically engaging an in-circuit transistor unit having base, collector and emitter leads and connecting together two of said leads for testing said unit, a source of alternating signals of predetermined amplitude, switch means having first and second positions for connecting and reversing the connection of said source of signals across said in-circuit unit between its connected and unconnected leads to determine whether said unit is made of germanium or silicon material, the voltage of said signal having a predetermined peak amplitude sufficient to cause forward current conduction of transistor units composed of germanium material and an amplitude insufficient to cause forward current conduction of transistor units composed of silicon material, and means for detecting the rectification of said signal by said unit for determining by the presence or absence of said rectified signal whether said unit is composed respectively of germanium or silicon material including a capacitor element charged by said rectified current and a device detecting the charge amplitude of said capacitor with said switch means in its first and second positions for determining the material of said unit under test.

11. The means of claim 10 in which said source of alternating signals provides a square wave signal with a zero direct current component.

12. The means of claim 10 including output means for delivering respectively first or second signals for continued testing of said unit responsive to said detecting means determining the material of said unit.

13. The means of claim 12 in which said output means comprises a relay delivering a direct current signal of 1.4 volts when deenergized and a direct current signal of .7 volt when energized by said detecting means upon determining that the transistor unit under test is composed of germanium material.

References Cited

UNITED STATES PATENTS

| 2,922,954 | 1/1960 | Bigelow | 324—158 |
| 3,051,900 | 8/1962 | Zechter et al. | 324—158 |
| 3,287,643 | 11/1966 | Reich et al. | 324—158 |
| 3,356,945 | 12/1967 | Ryan et al. | 324—158 |

OTHER REFERENCES

Electronic Technician, Selenium Rectifier Testing (A. R. Clawson), February 1967, pp. 32–33.

RUDOLPH V. ROLINEC, Primary Examiner

E. L. STOLARUN, Assistant Examiner